United States Patent [19]

Wolff

[11] Patent Number: 4,679,584
[45] Date of Patent: Jul. 14, 1987

[54] SOFT SEAT Y-PATTERN CHECK VALVE

[75] Inventor: Harold E. Wolff, Alexandria, La.

[73] Assignee: Dresser Industries, Inc., Dallas, Tex.

[21] Appl. No.: 895,075

[22] Filed: Aug. 11, 1986

[51] Int. Cl.[4] .............................................. F16K 15/02
[52] U.S. Cl. ................................. 137/269; 137/454.6;
137/543.19
[58] Field of Search ............ 137/454.2, 454.6, 543.19,
137/269, 271

[56] References Cited

U.S. PATENT DOCUMENTS

| 2,417,494 | 3/1947 | Hoof | 251/332 |
| 3,438,391 | 4/1969 | Yocum | 137/516.29 |
| 3,511,470 | 5/1970 | Beckett | 137/454.6 X |
| 4,039,003 | 8/1977 | Cheek | 137/543.19 X |

FOREIGN PATENT DOCUMENTS 1204646  1/1960  France ............. 137/543.19

Primary Examiner—Robert G. Nilson

[57] ABSTRACT

A soft seat Y-pattern check valve (10) is disclosed which can employ the valve body pattern of a valve body (12) used for a conventional Y-pattern on-off valve (18). The narrow annular seal seat (32) present in the valve body (12) is rendered inactive to the check valve function by forming an extension of the passage through the valve with a cage (34) by forming a permanent seal between the cage and narrow annular seal seat with a permanent seal (42). The cage defines a soft seal seat (70) for cooperating with a soft seal (66) mounted in a disk (52). When fluid flows from the inlet passage to the outlet passage, the disk and soft seal are moved out of engagement with the soft seal surface. Reverse flow causes the disk and soft seal to move into sealing engagement with the soft seal surface to check reverse flow.

10 Claims, 2 Drawing Figures

SOFT SEAT Y-PATTERN CHECK VALVE

TECHNICAL FIELD

This invention relates to control of fluid flow, and in particular to a soft seat check valve.

BACKGROUND OF THE INVENTION

Control of fluid flow is important in many applications, whether the fluid flow be liquid or gas. A common flow control is a check valve, which allows fluid flow in one direction through the valve and prevents reverse flow in the opposite direction.

One commonly encountered fluid control is the so-called Y-pattern valve. These valves are known as Y-pattern valves because the passages through the valve intersect in a pattern resembling the letter Y. For example, an inlet passage can extend into the body of the valve along one direction, an outlet passage can extend in the body along another direction and an intermediate passage along a third direction, forming a Y-pattern where they intersect. The intermediate passage forms the intersection between the inlet and outlet passages. Commonly, some type of valve closure element will be positioned in the intermediate passage for controlling flow between the inlet and outlet passages.

One common Y-pattern valve includes a body defining a narrow annular seal seat along the intermediate passage. The narrow seat lies in a plane generally perpendicular to the flow direction and forms a seat for engagement with an annular valve stem to block flow through the valve. The valve stem is typically threaded into the valve body so that rotation of the valve stem moves the stem toward or away from the narrow annular seat to open and close the valve. While these type of on-off valves are very useful, it would be desirable to use the basic pattern of the valve body for other flow control applications. However, the narrow annular seat found in the valve body has until this time generally only been usable with a conventional valve stem for the limited function of an on/off valve.

SUMMARY OF THE INVENTION

In accordance with one aspect of the present invention, a check valve is formed with a valve body having a flow passage therethrough. The valve body defines a narrow annular seal seat about the passage. The check valve includes structure for forming a permanent seal against the narrow annular seal seat and further forming a continuation of the walls of the flow passage from the permanent seal along one direction of flow to define an annular soft seal surface. Structure is also provided for mounting an annular soft seal and for blocking fluid flow through the center of the soft seal. The mounting structure is responsive to fluid flow in a first direction through the passage to move the soft seal away from the soft seal surface and responsive to fluid flow in the opposite direction to move the soft seal into sealing engagement with the soft seal surface to perform a check valve function.

In accordance with another aspect of the present invention, the structure forming a permanent seal includes an annular permanent seal mounted at one end of a cylindrical cage and structure for forcing the cage toward the narrow annular seal seat to form a permanent seal between the annular permanent seal and the narrow annular seal seat. The mounting structure includes a disk having a chamber formed through one side thereof with a beveled edge to receive the soft seal and a seal retainer with a beveled edge received in the chamber to retain the soft seal within the disk. Structure is provided for urging the soft seal into engagement with the soft seal surface with sufficient force to operate as a check valve regardless of valve orientation.

BRIEF DESCRIPTION OF THE DRAWINGS

A more complete understanding of the invention can be had by referring to the following Detailed Description taken with the accompanying Drawings, wherein.

DETAILED DESCRIPTION

Figures 1, 2:
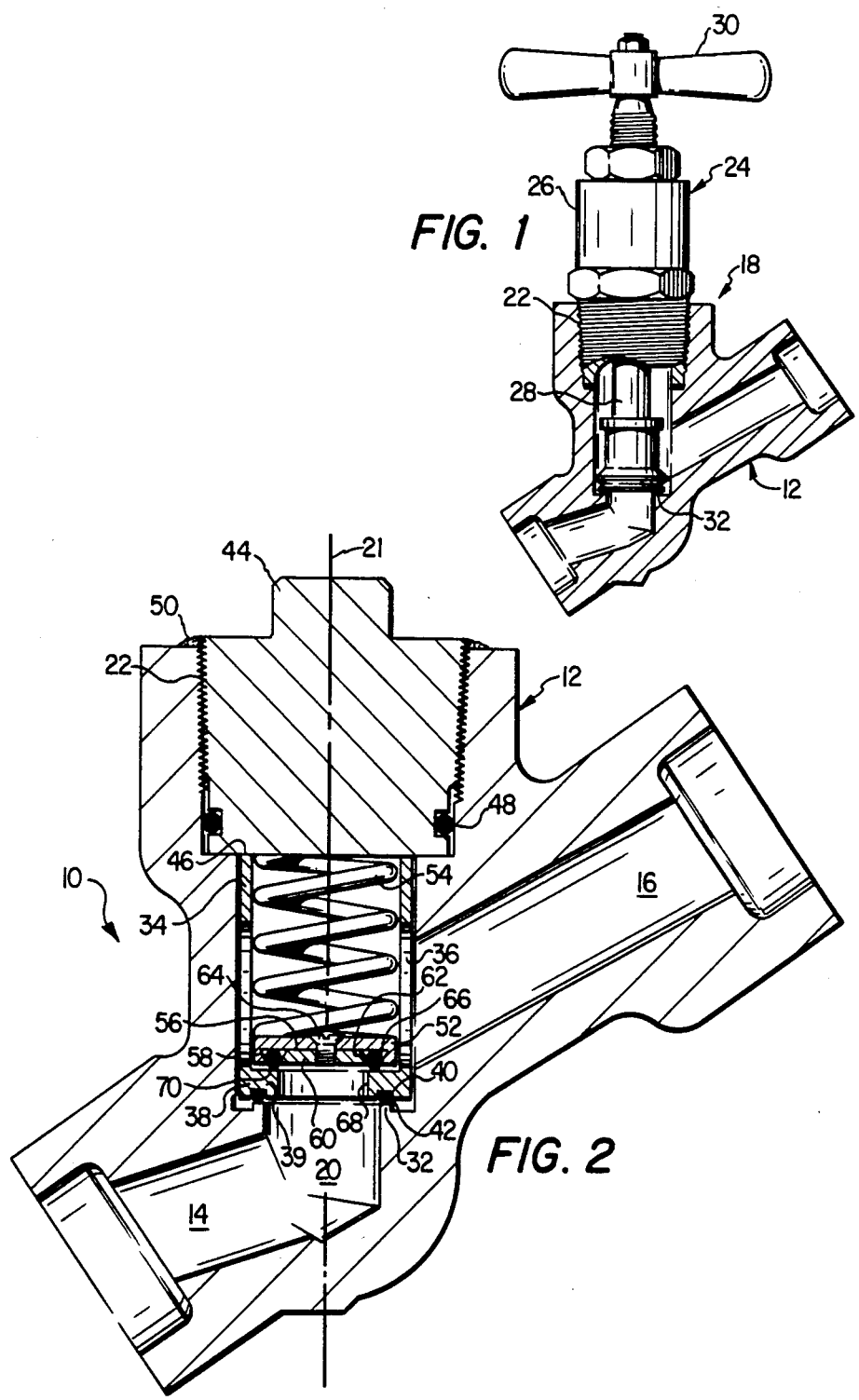
FIG. 1 is a cross-sectional side view of a Y-pattern on-off valve of the type whose valve body is employed in the present invention.
FIG. 2 is a cross-sectional side view of the Y-pattern check valve forming a first embodiment of the present invention.

Referring now to the drawings, wherein like reference numerals designate like or corresponding parts throughout the views, and in particular to FIG. 2, a soft seated Y-pattern check valve 10 is illustrated. The check valve 10 permits flow of a fluid, in particular a high pressure gas, through the valve in one flow direction, but checks the flow in the reverse direction. More particularly, the valve body 12 defines an inlet passage 14 and an outlet passage 16. The valve permits flow from inlet passage 14 from a supply (not shown) and through the outlet passage 16 to a desired location (not shown). The check valve 10 checks reverse flow from outlet passage 16 to inlet passage 14.

The valve body 12 of the check valve 10 is formed substantially identical to the valve body 12 of a conventional Y-pattern on-off valve 18 as seen in FIG. 1. The inlet and outlet passages are interconnected by an intermediate passage 20 having center line 21 which opens out through the valve body through a threaded portion 22. In the on-off valve 18, the intermediate passage 20 receives a valve handle assembly 24 which is threaded into portion 22. The valve handle assembly 24 has an outer portion 26 and a valve stem 28 threaded to the outer portion 26. A valve handle 30 is mounted on the exterior end of valve stem 28 to permit an operator to rotate the valve stem 28 about the longitudinal axis of passage 20 to move the valve stem 28 into and out of engagement with a narrow annular seal seat 32 to shut the valve on and off.

A significant advantage of the present invention is the ability to use the valve body 12 common to check valve 10 and the conventional on-off valve 18 with a soft seal to form a reliable and inexpensive check valve. By simply placing the components described hereinafter in a conventional on-off valve body 12, the body can be transformed to a check valve.

With reference to FIG. 2, a cylindrical cage 34 is inserted into the intermediate passage 20. Cage 34 has openings 36 through the cylindrical wall thereof. A first end 38 of the cage 34 has an annular, inwardly directed lip 39 with an annular recess 40 to receive a permanent seal 42 shaped and sized to permanently seal against the narrow annular seal seat 32. A threaded cap 44 is threaded into the threaded portion 22 to contact the opposite end 46 of the cage and force the permanent seal 42 against the narrow annular seal seat 32. A conventional 0-ring seal 48 can be received in an annular recess about the threaded cap 44 to seal against the valve body 12 to prevent leakage out of the valve body from the intermediate passage 20. An optional seal weld 50 can be formed to provide a secondary seal to block flow from the valve through the mating threads of the cap and valve body.

An annular disk 52 having an outer diameter similar to the inner diameter of the cylindrical cage 34 is received within the cage. A helical spring 54 acts between the end of the cap 44 and a first side of the disk to urge the disk toward the first end of the cage. The opposite side of disk 52 has a chamber 56 formed therein with beveled walls 58. A seal retainer 60 is received within the chamber and also has beveled walls 62. The seal retainer 60 is maintained within the chamber by a screw 64. A soft annular seal 66 is retained between the beveled walls 58 and 62 of the disk 52 and seal retainer 60 as illustrated, with a portion of the seal extending out of the chamber 56.

As can been seen in FIG. 2, the cage 34 defines a passage wall 68 on the inside of lip 39 which forms a portion of the wall of the intermediate passage when the permanent seal 42 is sealed against the narrow annular seal seat 32. The cage also defines an annular soft seal seat 70 on lip 39 facing the interior of the cage in a plane perpendicular the central axis of the intermediate passage and spaced downstream of the narrow annular seal seat 32. The annular soft seal seat 70 is sized so that the portion of the soft seal 66 extending from the chamber 56 can form an annular seal therewith to block flow through the valve.

The valve 10 thus forms a check valve. Fluid entering the inlet passage 14 forces the disk 52 and soft annular seal 66 away from the soft seal seat 70 by compressing the helical spring 54 to permit flow through the intermediate passage into the outlet passage. If reverse flow was attempted, the flow would assist the spring 54 in urging the disk and soft seal 66 into sealing engagement with the soft seal seat 70 to check the reverse flow. While the spring 54 need not be employed if the check valve is mounted with the intermediate passage generally vertical with the cap at the top so that gravity assists the fluid forces in checking reverse flow, the spring is advisable for providing reliable operation of the valve in other orientations.

While a single embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. A check valve formed with a valve body having a flow passage, the valve body being an on-off Y-pattern valve body having a narrow annular seal seat to cooperate with a valve stem, the narrow annular seal seat unsuitable for use with a soft seal, said check valve comprising:

means for forming a permanent seal against the narrow annular seal seat, said means further forming a continuation of the walls of the flow passage from the permanent seal along one direction of flow and defining an annular soft seal surface of surface area sufficiently greater than the narrow annular seal seat for sealing engagement with an annular soft seal;

an annular soft seal;

means for mounting a portion of the annular soft seal thereto and for blocking fluid flow through the center of the soft seal; and said mounting means responding to fluid flow in a first direction through the passage to move the soft seal away from the soft seal surface and responding to reverse flow through the passage to force the soft seal into sealing engagement with the soft seal surface to check reverse flow.

2. The check valve of claim 1 wherein said means for forming a permanent seal include an annular permanent seal, a cylindrical cage mounting said annular permanent seal in one end thereof, the cylindrical cage having openings through the wall thereof, and means for urging the cage toward the narrow annular seal seat to form a permanent seal between the narrow annular seal seat, permanent seal and cylindrical cage.

3. The check valve of claim 1 wherein said mounting means comprises a disk having a chamber formed through one side thereof for receiving a portion of the soft seal and means for retaining said portion of the soft seal within the disk, means being provided for guiding the disk to move the soft seal into and out of engagement with the soft seal surface.

4. The check valve of claim 1 further comprising means for continuously urging the soft seal against the soft seal surface to check flow so that the check valve can be oriented in any orientation relative to gravity force.

5. A check valve formed with a valve body having an inlet passage and an outlet passage and an intermediate passage interconnecting the inlet and outlet passages, said intermediate passage having a center line, and an opening at one end outside the valve body, the valve body being an on-off Y-pattern valve body having a narrow annular seal seat about the intermediate passage lying in a plane generally perpendicular the center line of the intermediate passage to cooperate with a valve stem, the narrow annular seal surface being unsuitable for sealing engagement with a soft seal, said check valve comprising:

a cylindrical cage inserted within the intermediate passage and centered on the center line of the intermediate passage, a first end of the cage having an annular recess facing the narrow annular seal seat of the valve body, the wall of the cage having at least one opening therethrough;

an annular permanent seal mounted in the recess in the first end of the cage;

means for urigning the cage along the center line to form a permanent seal between the cage, permanent seal and narrow annular seal seat, the opening through the first end of the cage and the opening through the wall of the cage forming portions of the intermediate passage through the valve., the first end of said cylindrical cage defining a soft seal surface centered on the center line of the intermediate passage having a surface area sufficiently greater than the narrow annular seal seat for sealing engagement with an annular soft seal;

an annular disk received within the interior of the cage for sliding movement along the center line within the cage, said disk having a chamber formed into a first side thereof facing the first end of the cage;

an annular soft seal having a portion received within the chamber of the disk;

means for retaining said soft seal portion within the chamber; and fluid flow into the inlet passage urging the disk and soft seal away from the soft seal surface on the cage to permit flow through the intermediate passage, reverse flow driving the disk and soft seal along the center line within the cage to form a seal between the soft seal and the soft seal surface to check reverse flow.

6. The check valve of claim 5 further comprising spring means for urging the disk and soft seal into sealing engagement with the soft seal surface so that the check valve can be oriented in any desired position relative to gravity.

7. The check valve of claim 5 wherein a portion of the intermediate passage is threaded to receive a threaded cap, said threaded cap forming said means for urging the cage and permanent seal into sealing engagement with the narrow annular seal seat.

8. A check valve formed with a Y-pattern valve body having an inlet passage and an outlet passage interconnected by a intermediate passage, the intermediate passage having a center line and defining a narrow annular seal seat lying in a plane perpendicular the center line for cooperating with a valve stem to form an on-off Y-pattern valve, said narrow annular seal seat unsuitable for sealing engagement by a soft seal, said check valve comprising:

a cylindrical cage received within the intermediate passage and concentric with the center line thereof, a first end of the cage defining an annular portion extending radially inward toward the center line, said annular portion defining a recess facing the narrow annular seal surface on the valve body, an inner cylindrical surface for forming a portion of the intermediate passage and an interior annular surface defining a soft seal surface, said soft seal surface having a surface area sufficiently greater than the narrow annular seal seat for sealing engagement with an annular soft seal, a hole being formed through a portion of the wall of the cage to define a continuous flow passage;

a permanent seal having a portion thereof mounted in the recess in the first end of the cage;

a threaded cap threadedly received in the intermediate passage to drive the cage and permanent seal against the narrow annular seat seal to form a permanent seal therebetween so that the only flow path through the intermediate passage is through the first end of the cage, into the interior of the cage and from the interior of the cage through the opening in the cylindrical wall of the cage;

an annular disk within the interior of the cage for movement along the center line, said disk having a chamber formed into one side thereof, the chamber facing the first end of the cage;

a soft seal having a portion thereof received within the chamber and the disk;

means for retaining said portion of the soft seal within the disk; and fluid flow through the check valve from the inlet passage to the outlet passage forcing the disk and soft seal away from the first end of the cage to permit fluid flow through the valve, reverse flow forcing the disk toward the first end of the cage to form a seal between the disk, soft seal and soft seal surface to check reverse flow.

9. The check valve of claim 8 wherein said means for retaining said portion of the soft seal comprises a seal retainer and a threaded screw for holding the seal retainer within the chamber of the disk, said portion of the soft seal being retained between beveled wall surfaces on the disk and seal retainer.

10. The check valve of claim 8 further comprising a helical spring acting between the threaded cap and the side of the disk opposite the chamber to urge the disk and soft seal against the soft seal surface to permit the check valve to be oriented in any relation to the gravity force.

* * * * *